United States Patent [19]

Bhat

[11] 4,280,587

[45] Jul. 28, 1981

[54] NOISE-SUPPRESSING JET ENGINE NOZZLES AND METHOD

[75] Inventor: Waman V. Bhat, Redmond, Wash.

[73] Assignee: The Boeing Company, Seattle, Wash.

[21] Appl. No.: 37,381

[22] Filed: May 8, 1979

[51] Int. Cl.$^3$ .............................................. F02K 1/34
[52] U.S. Cl. ..................................... 181/213; 60/262
[58] Field of Search ................. 60/262; 181/213, 215, 181/216, 217, 218, 219, 220, 221, 222

[56] References Cited

U.S. PATENT DOCUMENTS

| 3,174,282 | 3/1965 | Harrison | 60/35.6 |
| 3,393,518 | 7/1968 | Bridge | 60/271 |
| 3,495,682 | 2/1970 | Treiber | 181/220 |
| 3,527,317 | 9/1970 | Motsinger | 181/35 |
| 3,543,876 | 1/1970 | Karlson | 181/43 |
| 3,583,640 | 6/1971 | MacDonald | 239/265.13 |
| 3,612,212 | 10/1971 | MacDonald | 181/33 HC |
| 3,618,701 | 11/1971 | MacDonald | 181/221 |
| 3,964,568 | 6/1976 | Neumann | 181/216 |
| 3,968,853 | 7/1976 | Hoch et al. | 181/33 C |

OTHER PUBLICATIONS p. 207 from McGraw-Hill Encyclopedia of Science and Technology.

*Primary Examiner*—Jerry W. Myracle
*Attorney, Agent, or Firm*—Robert W. Beach; Ward Brown

[57] ABSTRACT

A discharge nozzle of a jet engine has lobes, tubes or deflectors for promoting mixing of the engine discharge flow with ambient air to reduce jet noise. By providing the lobes, tubes or deflectors at only the upper portion of the discharge nozzle, jet noise perceived below the engine is reduced substantially without shifting the noise spectrum to include a higher proportion of piercing and irritating high frequency noise components. Additionally, in a turbofan, the fan or secondary flow is discharged below the primary exhaust flow to further reduce noise perceived below the turbofan.

29 Claims, 53 Drawing Figures

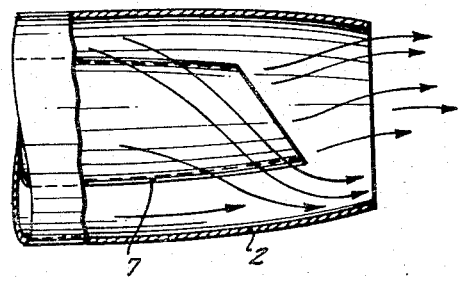
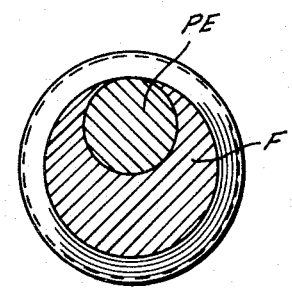
Fig.19.   Fig.20.
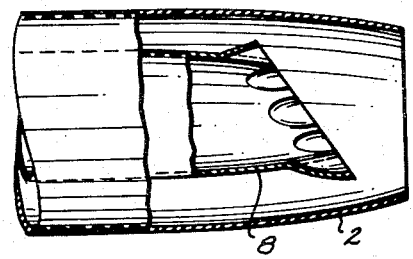
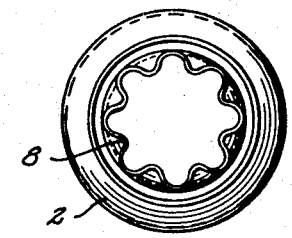
Fig.21.   Fig.22.
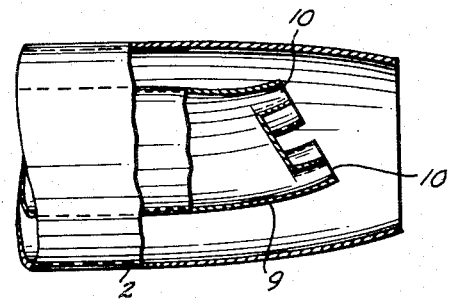
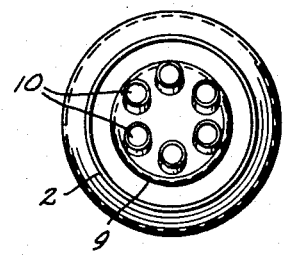
Fig.23.   Fig.24.

Fig. 29.
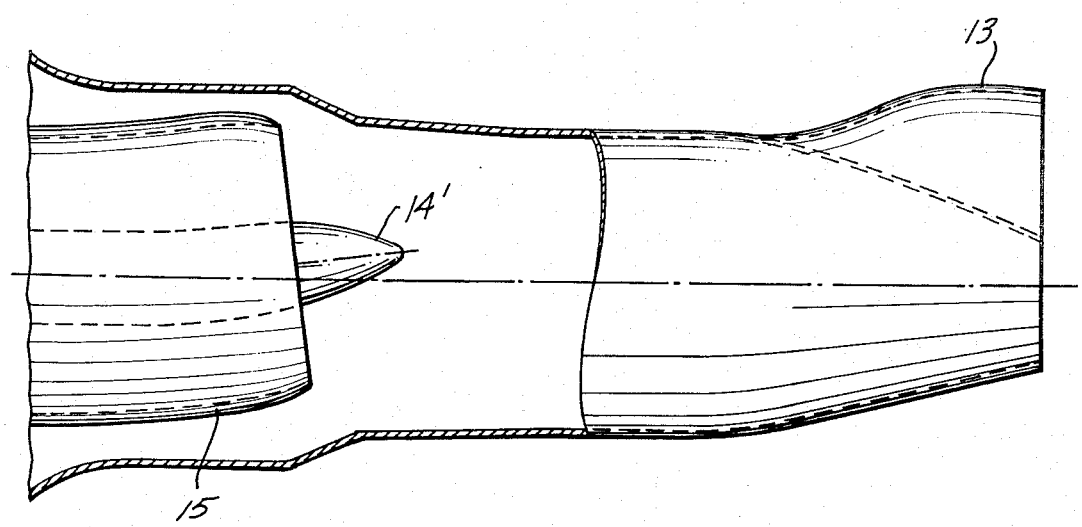
Fig. 30.
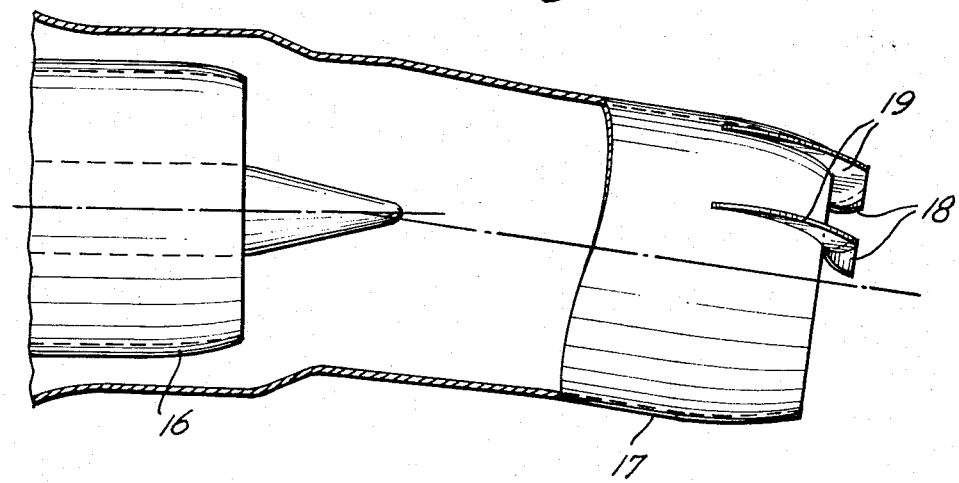
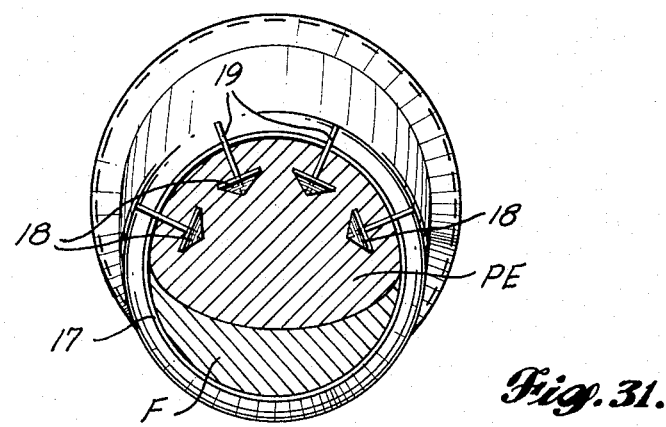
Fig. 31.

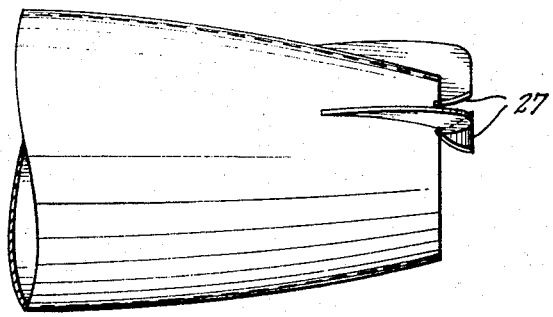 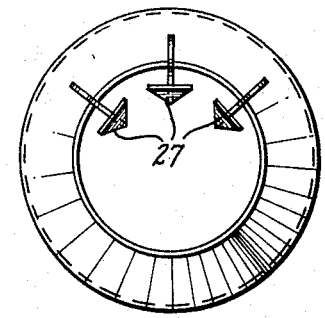
Fig. 40.     Fig. 41.
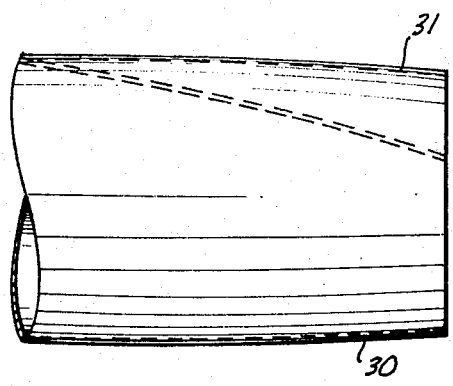 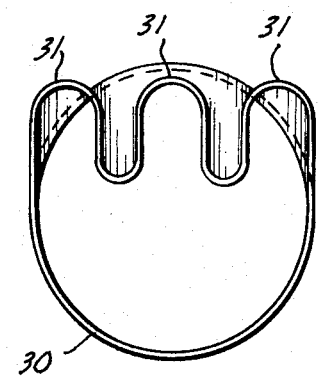
Fig. 42.     Fig. 43.
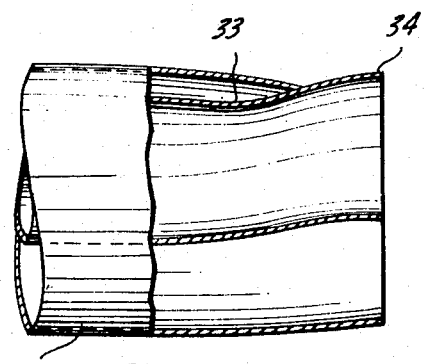 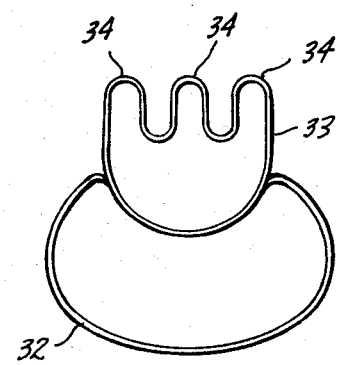
Fig. 44.     Fig. 45.

NOISE-SUPPRESSING JET ENGINE NOZZLES AND METHOD

CROSS-REFERENCE

This application is related to U.S. application Ser. No. 943,973, filed Sept. 19, 1978 in the names of Waman V. Bhat and Charles P. Wright, for Noise Suppressing Turbofan Nozzles and Method.

BACKGROUND OF THE INVENTION

1. Field of the Invention

The present invention relates to noise-suppressing jet engine nozzles and methods.

2. Prior Art

A principal component of the noise produced by a jet engine is jet noise, that is, noise from the turbulent mixing of a high velocity stream of gas flowing from a gas discharge nozzle of the engine into the ambient atmosphere.

One way to promote rapid mixing of a discharge flow with ambient air is to provide a multitube discharge nozzle, such as the nozzle shown in FIGS. 1 and 2 of U.S. Pat. No. 3,612,212. Alternatively, a multilobe nozzle, such as the nozzle shown in FIG. 3 of that patent, can be used. An asymmetrical, multilobe mixing nozzle is shown in FIGS. 1, 2 and 3 of U.S. Pat. No. 3,174,282. A nozzle having a notch to promote mixing is disclosed in U.S. Pat. No. 3,968,853.

Another way to promote mixing is to provide a deflector for directing ambient air toward the flow. Such a deflector can be in the form of an annular "aspirator ring", as shown in U.S. Pat. No. 3,174,282, or in the form of swingable "doors", as shown in U.S. Pat. No. 3,583,640.

In a conventional turbofan, jet noise can be reduced by mixing the primary or exhaust flow, that is, the stream of combustion gas discharged from the combustor and turbine, with the fan or secondary flow of air bypassing the jet engine compressor through the fan duct. According to the *McGraw-Hill Encyclopedia of Science and Technology*, combining the primary exhaust and secondary fan flows results in a jet noise reduction of from 5 to 10 dB (see Vol. 1, page 207). Further noise reduction can be accomplished by promoting rapid and complete mixing of the combined flow with the ambient atmosphere.

One problem with suppressing jet noise by mixing a high temperature, high velocity flow with ambient air or a cooler flow of lesser velocity is that mixing changes the noise spectrum or "signature" to include a greater proportion of high frequency noise. Since high frequency noise can be more irritating than low frequency noise, the overall noise level may be reduced without a corresponding reduction in the number of complaints to the noise produced by a jet engine.

U.S. Pat. No. 3,618,701 discloses another method of jet noise suppression which includes ejecting a "gaseous shield" below a jet engine discharge flow. However, this method requires complicated additional mechanism adding to the weight of an aircraft without appreciably increasing thrust.

Yet another method of suppressing jet noise is disclosed in U.S. Pat. No. 3,393,518 in which the high temperature primary exhaust flow of a turbofan is discharged from the engine beneath at least the greater part of the stream of air which is passed through the fan, so that the noise in the stream of air tends to be refracted and/or reflected upwardly by the turbine exhaust gases.

See the abstract of U.S. Pat. No. 3,393,518. This patent is concerned with suppressing fan noise, whereas the present application is concerned with suppressing jet noise. As pointed out in U.S. Pat. No. 3,527,317, different methods must be used to suppress the different types of noise (see the paragraph beginning at column 1, line 47).

SUMMARY OF THE INVENTION

It is an object of the present invention to provide a method and apparatus for reducing the noise perceived at a selected location relative to a jet engine of an aircraft, such as directly below the engine or at a selected sideline angle to the engine, particularly during take-off and landing.

It also is an object to provide such method and apparatus in a form for reducing noise perceived at such selected location without undesirably altering the noise spectrum of the jet engine.

Another object is to provide such apparatus and method in forms in which they may be incorporated into and used easily with conventional engines without requiring complicated, heavy or expensive additional parts.

The foregoing objects can be accomplished by promoting rapid mixing with ambient air of only the portion of a jet engine discharge flow which is generally remote from the selected location, or by promoting substantially more mixing with ambient air of such remote discharge flow portion than of the portion of such flow closest to the selected location.

In the disclosed embodiments, apparatus for promoting mixing of a portion of the discharge flow includes lobes, tubes or deflectors arranged asymmetrically of the aftmost discharge nozzle of a jet engine.

In turbofan installations, apparatus for discharging the fan flow nearer the selected location than the exhaust flow is provided to further reduce noise perceived at the selected location.

BRIEF DESCRIPTION OF THE DRAWINGS

FIG. 19 is a side elevation of the discharge end portion of a turbofan improved in accordance with a further embodiment of the invention of application Ser. No. 943,973 with parts broken away, and FIG. 20 is a somewhat diagrammatic representation of the flows produced by the turbofan of FIG. 19.

FIG. 21 is a side elevation of the discharge end portion of a turbofan improved in accordance with still another embodiment of the invention of application Ser. No. 943,973 with parts broken away, and FIG. 22 is an end elevation of the turbofan of FIG. 21.

FIG. 23 is a side elevation of the discharge end portion of the turbofan modified in accordance with still another embodiment of the invention of application Ser. No. 943,973 with parts broken away, and FIG. 24 is an end elevation of the turbofan of FIG. 23.

FIG. 30 is a side elevation of the discharge end portion of a turbofan improved with yet another embodiment of the present invention with parts broken away, and FIG. 31 is a somewhat diagrammatic end elevation of the turbofan of FIG. 30.

FIG. 40 is a side elevation of the discharge end portion of a turbojet modified in accordance with still another embodiment of the present invention with parts broken away, and FIG. 41 is an end elevation of the turbojet of FIG. 40.

FIG. 42 is a side elevation of the discharge end portion of a turbojet modified in accordance with still another embodiment of the present invention, and FIG. 43 is an end elevation of the turbojet of FIG. 42.

FIG. 44 is a side elevation of the discharge end portion of a turbofan modified in accordance with still another embodiment of the present invention with parts broken away, and FIG. 45 is an end elevation of the turbofan of FIG. 44.

DETAILED DESCRIPTION

As seen in FIGS. 1 through 6, in a conventional turbofan one flow of air, the "primary exhaust" flow, passes through a compressor, combustor and turbine and the exhaust gas is discharged from a generally circular primary exhaust nozzle 1. A separate flow of air, the "secondary" or "fan" flow, bypasses the compressor, combustor and turbine and is discharged from a generally circular fan nozzle 2. The primary exhaust nozzle is concentric within the fan nozzle and, accordingly, concentric primary exhaust and fan flows are produced. The primary exhaust flow is a high temperature, high velocity flow of generally circular cross section. The fan flow is of annular cross section, encircling the primary exhaust flow, and of less velocity and temperature.

Figure 1:
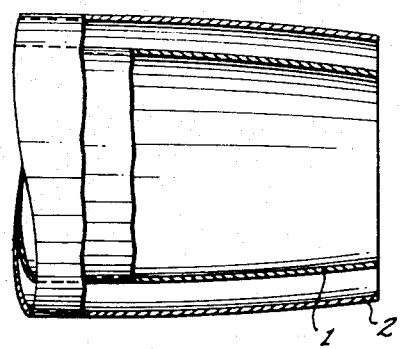
FIG. 1 is a side elevation of the discharge end portion of a conventional turbofan with parts broken away.
Figure 2:
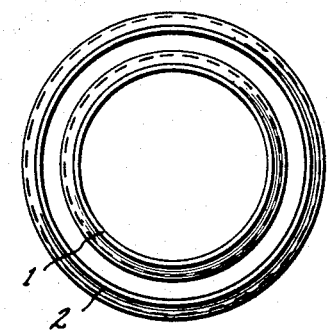
FIG. 2 is an end elevation of the turbofan of FIG. 1.
Figure 3:
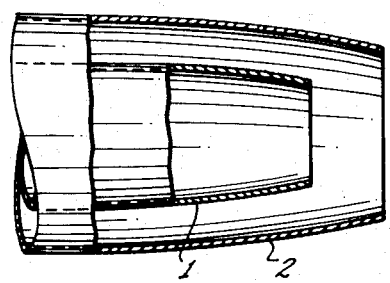
FIG. 3 is a side elevation of the discharge end portion of another type of conventional turbofan with parts broken away.
Figure 4:
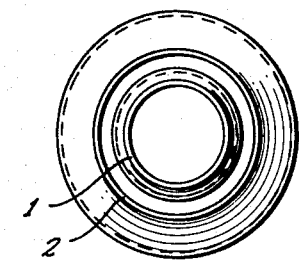
FIG. 4 is an end elevation of the turbofan of FIG. 3.
Figure 5:
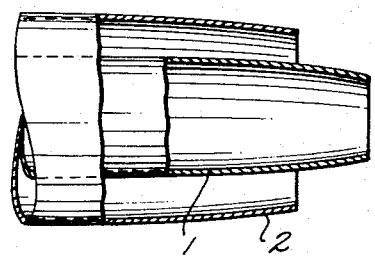
FIG. 5 is a side elevation of the discharge end portion of yet another type of conventional turbofan with parts broken away.
Figure 6:
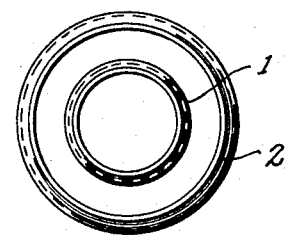
FIG. 6 is an end elevation of the turbofan of FIG. 5.

As best seen in FIG. 1, the discharge end of the primary exhaust nozzle can be coplanar with the discharge end of the fan nozzle. Alternatively, as shown in FIG. 3, the primary exhaust nozzle can be "retracted", that is, have its discharge end located forward of the discharge end of the fan nozzle. In this instance, the portion of the fan nozzle projecting aft of the discharge end of the exhaust nozzle can be referred to as the "common" nozzle. As best seen in FIG. 5, another alternative is to provide a "projected" primary exhaust nozzle, that is, a primary exhaust nozzle having its discharge end aft of the discharge end of the fan nozzle. Location of the primary exhaust nozzle projected beyond or retracted forward of the fan nozzle has no appreciable effect on the noise produced by the turbofan.

In a representative conventional turbofan, the discharge ends of both the primary exhaust nozzle and the fan nozzle are perpendicular to the longitudinal axis of the turbofan.

In accordance with the invention of application Ser. No. 943,973, noise perceived below a turbofan is reduced by "thickening" the portion of the lesser velocity fan flow between the higher velocity primary exhaust flow and an observer on the ground. As used herein, "thickening" means increasing the radial dimension of the portion of the fan flow closest to the observer. In the preferred embodiment of the invention of application Ser. No. 943,973, a substantially greater portion of the fan flow is disposed below the primary exhaust flow than above it, as diagrammatically represented in FIGS. 7 through 10 showing flow arrangements for maximum noise suppression directly below a turbofan.

Figure 7:
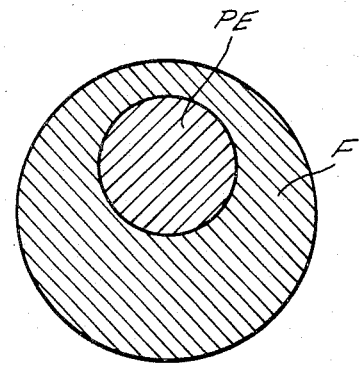
FIGS. 7, 8, 9 and 10 are diagrammatic representations of the primary exhaust and fan flows produced by the noise-suppressing apparatus and method of the invention of application Ser. No. 943,973 slightly downstream of the discharge nozzle of a turbofan, FIG. 7 showing the primary exhaust flow offset upward relative to the fan flow, FIG. 8 showing the primary exhaust flow offset slightly more upward in the fan flow so as to have its upper edge tangential with the upper edge of the fan flow, FIG. 9 showing the primary exhaust flow offset upward to an even greater degree so that part of the primary exhaust flow is above the fan flow, and FIG. 10 showing the primary exhaust flow offset upward to an even greater degree so that all of the primary exhaust flow is above the fan flow.
Figure 8:
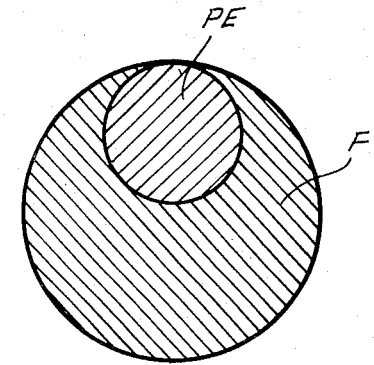
Figure 9:
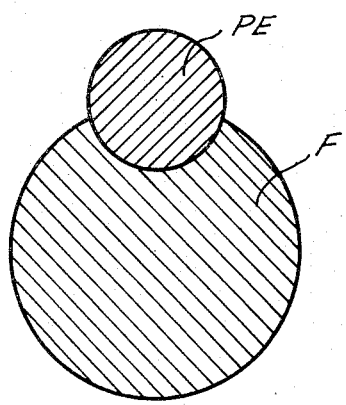
Figure 10:
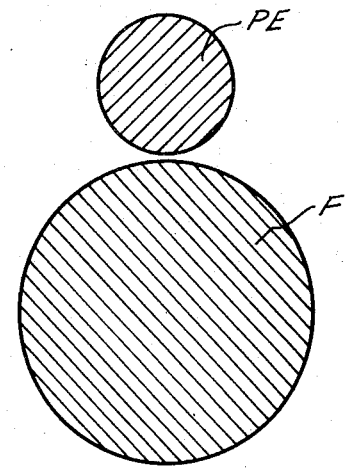

In FIG. 7, the primary exhaust flow PE is offset upward relative to the fan flow F, but the primary exhaust flow is surrounded by the fan flow. In FIG. 8, the primary exhaust flow PE is offset upward relative to the fan flow F slightly more than the primary exhaust flow of FIG. 7, such that the upper edge of the primary exhaust flow is tangential to the upper edge of the fan flow. In FIG. 9, the primary exhaust flow PE is offset even further upward, such that a portion of the primary exhaust flow is outside of the fan flow. In FIG. 10, all of the primary exhaust flow is above the fan flow. Thus, in each of the embodiments of FIGS. 7 through 10, the upright dimension or "thickness" of the fan flow directly below the primary exhaust flow is greater than if the flows were concentric as would result from the nozzle arrangements of FIGS. 1 to 6.

Provision of any of the flow patterns shown in FIGS. 7 through 10 results in a reduction in the noise level perceived below the turbofan. Why perceived noise is reduced by the relative arrangement of primary exhaust flow and fan flow discussed above is not clearly understood, because the exact causes of the noise produced by any jet aircraft engine, and particularly the causes of the noise produced by a turbofan, have not been determined precisely. It is believed that the perceived noise reduction is attributable to the fact that in each of the flow relationships of FIGS. 7 to 10 at least a portion of the primary exhaust flow is closer to the ambient atmosphere than such portion would be with concentric flows, so that more rapid mixing of the primary exhaust flow with the ambient atmosphere occurs. In addition, it is believed that the jet noise produced by the high velocity, high temperature primary exhaust flow is radiated downward to a lesser extent than in other directions because of reflection or scattering of sound waves by the thickened lesser velocity fan flow.

Another possible benefit is that core noise, that is, noise produced by the compressor, combustor and turbine, is radiated more through the primary exhaust flow than through the fan flow and, because of reflection or scattering, is radiated to a lesser extent downward than in other directions. Similarly, a certain amount of fan tones or fan noise will be radiated through the primary exhaust nozzle of the turbofan and scattered or reflected. At any rate, the noise perceived below the turbofan is reduced significantly by thickening the lower portion of the fan flow.

Figure 11:
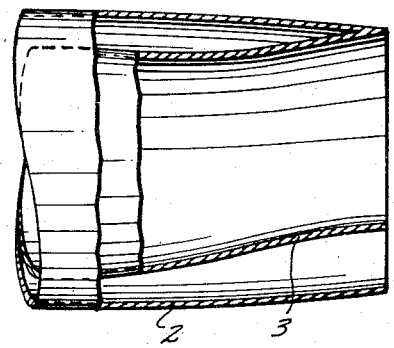
FIG. 11 is a side elevation of the discharge end portion of a turbofan improved in accordance with the invention of application Ser. No. 943,973 with parts broken away.
Figure 12:
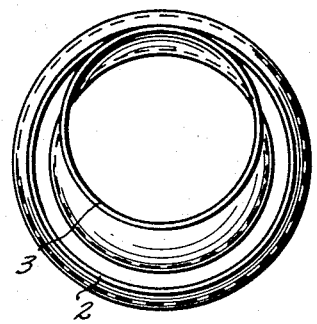
FIG. 12 is an end elevation of the turbofan of FIG. 11.

Conventional turbofan nozzles can be modified to produce a noise-suppressing thickened fan flow in accordance with the invention of application Ser. No. 943,973. As shown in FIGS. 11 and 12, the portion of a primary exhaust nozzle 3 located a substantial distance forward of its discharge end can be circular and concentric within a conventional fan nozzle 2. The portion of primary exhaust nozzle 3 adjacent to its discharge end can be swept upward so that the upper edge of the discharge end of the primary exhaust nozzle is tangential to the upper edge of the fan nozzle.

Figure 13:
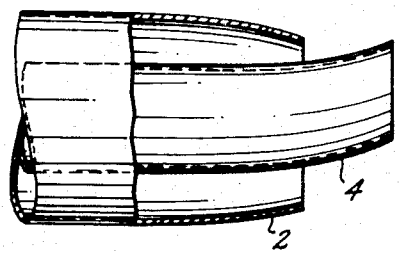
FIG. 13 is a side elevation of the discharge end portion of a turbofan improved in accordance with an alternative embodiment of the invention of application Ser. No. 943,973 with parts broken away.
Figure 14:
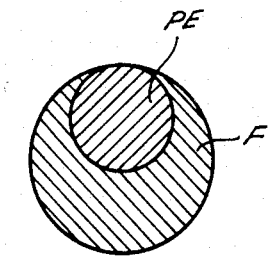
FIG. 14 is a diagrammatic representation of the flows produced by the turbofan of FIGS. 11 and 12 or the turbofan of FIG. 13.

In the embodiment of FIGS. 11 and 12, the discharge ends of the primary exhaust and fan nozzles are coplanar. However, as shown in FIGS. 13 and 14, the same type of modification can be provided for a turbofan having a projected primary exhaust nozzle 4 by sweeping upward only the projecting portion of such nozzle. As shown in FIG. 14, the flow pattern of each of these embodiments corresponds to the flow pattern shown in FIG. 8 in that the peripheries of both the primary exhaust flow and the fan flow are circular and the primary exhaust flow is offset upward relative to the fan flow with its upper edge tangential to the upper edge of the fan flow.

Figure 15:
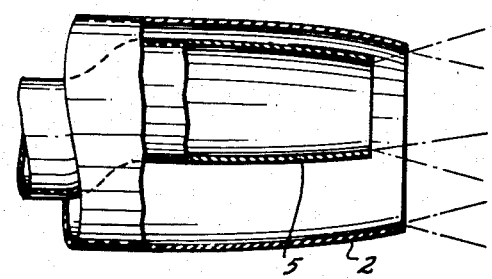
FIG. 15 is a side elevation of the discharge end portion of a turbofan improved in accordance with yet another embodiment of the invention of application Ser. No. 943,973 with parts broken away.
Figure 16:
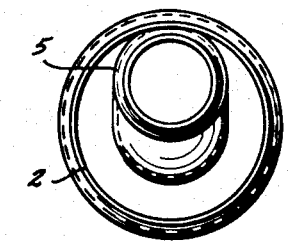
FIG. 16 is an end elevation of the turbofan of FIG. 15.

In the embodiment of FIGS. 15 and 16, almost the entire primary exhaust nozzle 5 is offset upward relative to a conventional fan nozzle 2. The flow pattern produced by the embodiment of FIGS. 15 and 16 generally corresponds to the flow pattern of FIG. 7.

In the embodiment shown in FIGS. 17 and 18, the fan flow is thickened below the primary exhaust flow without offsetting the primary exhaust nozzle relative to the fan nozzle. As in the embodiment of FIGS. 11 and 12, the portion of a primary exhaust nozzle 6 a substantial distance upstream of its discharge end is circular and concentric within a conventional fan nozzle 2. The upper and lower portions of the primary exhaust nozzle converge gradually rearward to form a discharge end which is flattened in that its horizontal dimension is substantially greater than its vertical dimension. Consequently, the thickness of the fan flow below the primary exhaust flow is substantially greater than if a conventional primary exhaust nozzle having the same cross-sectional area were located concentrically within the fan nozzle. In addition, much less of the fan flow passes laterally of the primary exhaust nozzle than in a conventional turbofan so the lateral portions of the primary exhaust flow mix rapidly with the ambient atmosphere.

Figure 17:
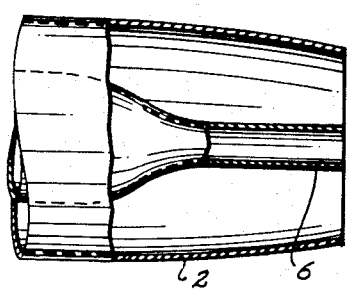
FIG. 17 is a side elevation of the discharge end portion of a turbofan improved in accordance with still another embodiment of the invention of application Ser. No. 943,973 with parts broken away.
Figure 18:
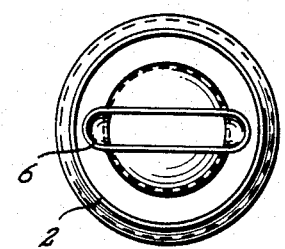
FIG. 18 is an end elevation of the turbofan of FIG. 17.

In the embodiment of FIGS. 17 and 18, the discharge ends of the primary exhaust nozzle and the fan nozzle are coplanar, but the primary exhaust nozzle could be either retracted or projected with little effect on the noise produced by the turbofan. The fan flow could be thickened even more by offsetting the flattened discharge end of the primary exhaust nozzle.

FIGS. 19 and 20 show another embodiment of the invention of application Ser. No. 943,973 in which a noise-suppressing thickened fan flow is provided without offsetting the primary exhaust nozzle. While primary exhaust nozzle 7 is retracted and generally circular and concentric within a conventional fan nozzle 2, the discharge end of the primary exhaust nozzle is canted so that, as indicated by the arrows in FIG. 19, the primary exhaust flow is directed upward as it leaves the primary exhaust nozzle and substantially more of the fan flow is expelled below the primary exhaust flow than if the discharge end of the primary exhaust nozzle were perpendicular to the longitudinal axis of the turbofan. As diagrammatically shown in FIG. 20, in the embodiment of FIG. 19 the flow pattern at the discharge end of the fan nozzle generally corresponds to the flow pattern of FIG. 8. A different cant angle could be used to produce a different flow pattern.

The embodiment of FIGS. 21 and 22 is a modification of the embodiment of FIGS. 19 and 20. The forward portion of a multilobe mixing nozzle 8 is generally circular and concentric within a conventional fan nozzle 2, and the discharge end of primary exhaust nozzle 8 is canted to direct the primary exhaust flow upward. The lobes are all of the same size and are arranged uniformly around the periphery of the nozzle. Because of the cant, a noise-suppressing thickened fan flow is produced. Noise is further reduced because beyond the discharge end of the fan nozzle the primary exhaust flow is mixed rapidly with ambient air and the fan flow because of the action of the nozzle lobes.

FIGS. 23 and 24 show a further modification in which a multitube mixing primary exhaust nozzle 9 is used. The major portion of such nozzle is generally circular and concentric within a conventional fan nozzle 2. However, each discharge tube 10 of such primary exhaust nozzle is swept upward to direct upward the portion of the primary exhaust flow passing through such tube. The discharge ends of tubes 10 are coplanar, and the plane defined by the discharge ends is inclined relative to the longitudinal axis of the turbofan.

Features of the various embodiments for thickening the fan flow shown in the drawings can be combined. For example, the discharge end of a primary exhaust nozzle could be both canted and offset upward relative to a fan nozzle; or canted and flattened; or canted, offset upward and flattened. In addition, various types of multilobe or multitube mixing nozzles can be used to further reduce noise. A primary exhaust nozzle in accordance with the invention of applicaton Ser. No. 943,973 can be in a position retracted ahead, or projected rearward beyond the end, of the fan nozzle as may be preferred.

Although each embodiment for producing a noisesuppressing thickened fan flow shown in the drawings includes a modified primary exhaust nozzle, a thickened fan flow could be provided by using a conventional primary exhaust nozzle and a modified fan nozzle. For example, instead of flattening the primary exhaust nozzle as shown in FIGS. 17 and 18, a fan nozzle could be flattened such that its vertical dimension is substantially greater than its horizontal dimension. Similarly, rather than canting the primary exhaust nozzle to offset the primary exhaust flow upward, the fan nozzle could be canted oppositely to offset the fan flow downward, or the primary exhaust nozzle could be canted upward and the fan nozzle canted downward. Any combination of primary exhaust nozzle modification and fan nozzle modification which will provide a thickened fan flow below the primary exhaust flow could be used.

A series of comparative tests were conducted to determine the amount of noise reduction resulting from the invention of application Ser. No. 943,973. In one set of tests the engine exhaust was provided with conventional, circular and concentric nozzles having coplanar discharge ends perpendicular to the longitudinal axis of the engine as shown in FIG. 1. In a second set of tests, the engine exhaust was provided with a primary exhaust nozzle modified along the lines of the embodiment of FIGS. 11 and 12, that is, the portion of the primary exhaust nozzle a substantial distance upstream of its discharge end was circular and concentric within the fan nozzle, but the portion adjacent to its discharge end was swept upward so that its upper edge was tangential to the upper edge of the discharge end of the fan nozzle. For comparison, in a third set of tests, the primary exhaust nozzle was modified along the lines shown in FIG. 2 of U.S. Pat. No. 3,393,518, the portion of the primary exhaust nozzle adjacent to its discharge end being swept downward so that the primary exhaust flow was discharged below the fan flow.

Figure 25:
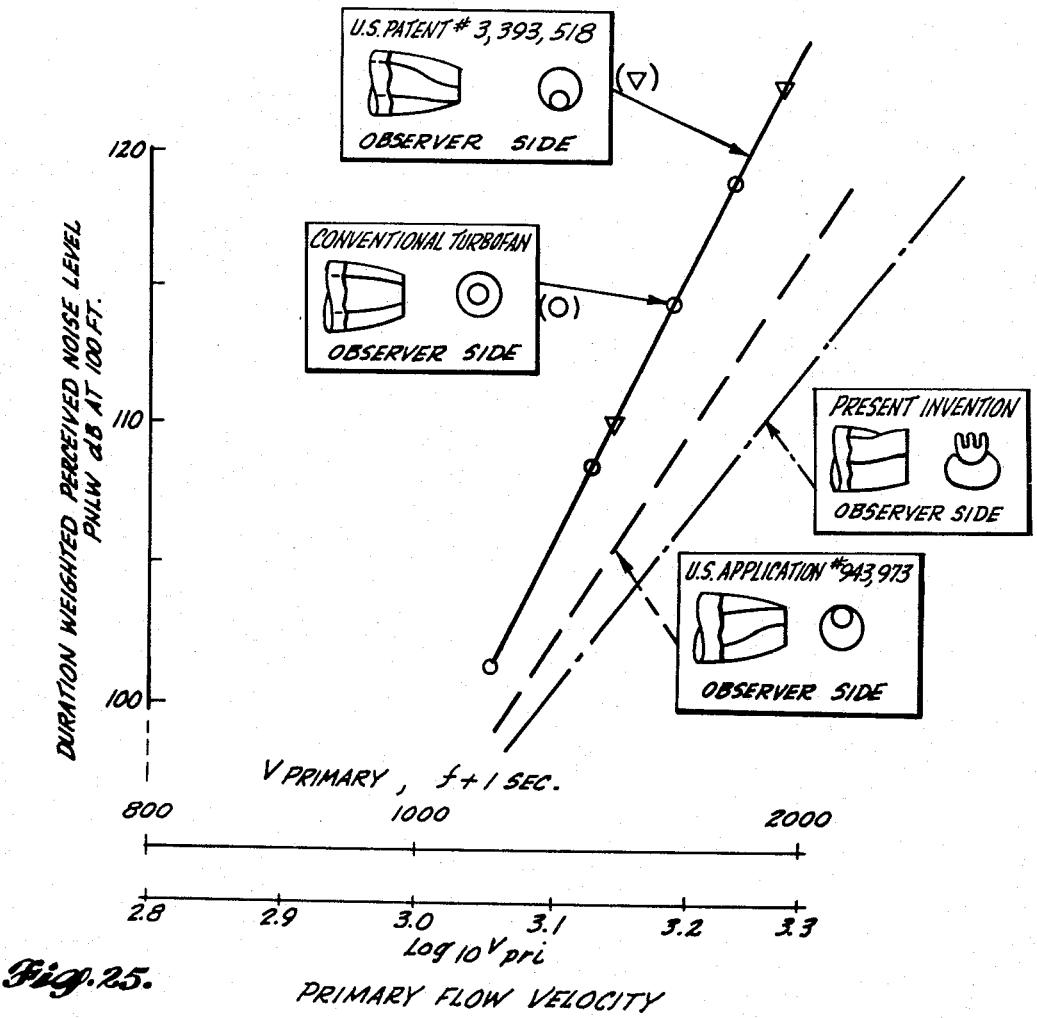
FIG. 25 is a graphic representation of the total noise reduction with reference to primary exhaust flow velocity achieved by one form of a turbofan modified in accordance with U.S. Pat. No. ___,518, one embodiment of the invention of ___ ___er. No. 943,973 and one embodiment ___ ___ention, as compared with ___ ___n of a conventional ___ ___ic discharge ___ ___e end portion with the ___. 27 is an ___ischarge ___. 28 is ___ion of ___ ___l portion of a turbofan improved in ac___ ___ alternative embodiment of the present invention with parts broken away.

In each set of tests, the noise levels at various points in the vertical plane containing the longitudinal axis of the turbofan were measured. The results of the test are shown in FIG. 25 in which the "duration weighted perceived noise level" (PNLW) is shown as a function of the velocity of the primary exhaust flow. PNLW is defined as:

$$PNLW = 10 \, \text{Log}_{10} \sum_{\theta=100°}^{150°} \left[ 10^{\frac{(PNL(\theta) - 10 \, \text{Log} \, \text{Sin}^2 \theta)}{10}} \right],$$

where:
 PNL=the perceived noise level in PNdB units; and
 $\theta$=the angle between the longitudinal axis extending forward from the fan nozzle and the line connecting the observation point and the center of the fan nozzle inlet.

The summation for $\theta$ angles between 100° and 150° was approximated by summing for $\theta$ angles in 10° increments.

As shown in FIG. 25, the tests revealed that modifying an exhaust nozzle in accordance with U.S. Pat. No. 3,393,518 results in no appreciable noise reduction, as measured in PNLW, over a turbofan exhaust model having conventional primary exhaust and fan nozzles. However, a substantial reduction in perceived noise below the turbofan is effected by modifying the primary exhaust nozzle in accordance with the invention of application Ser. No. 943,973 as shown by the dash line. For example, a representative primary exhaust flow velocity for a Pratt & Whitney JT8D engine at takeoff is 1,900 feet per second (580 m/sec). At this exhaust velocity, the noise observed below the engine as measured in PNLW was about 6 dB less than the noise measured below the engine having conventional nozzles.

In accordance with the present invention, noise perceived below a jet engine is reduced by promoting mixing of a generally upper portion of a discharge flow of a jet engine with ambient air. In turbofan applications, preferably the present invention is combined with the invention of application Ser. No. 943,973 in that, additionally, the turbofan fan flow is discharged below the turbofan primary exhaust flow to reduce noise further.

Figure 27:
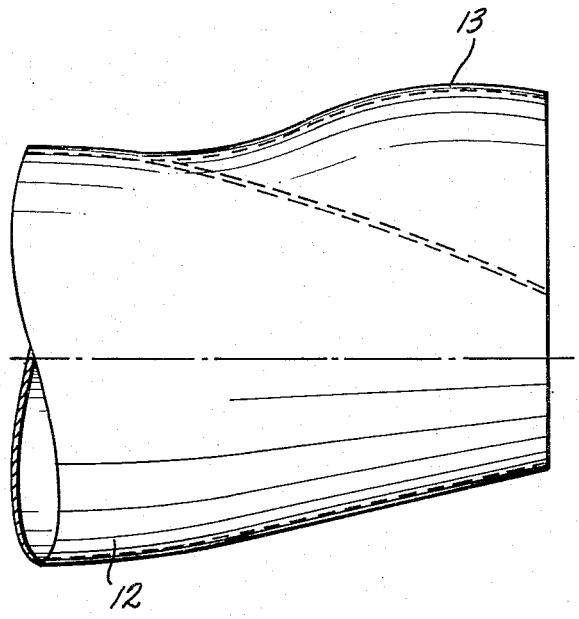
Figure 28:
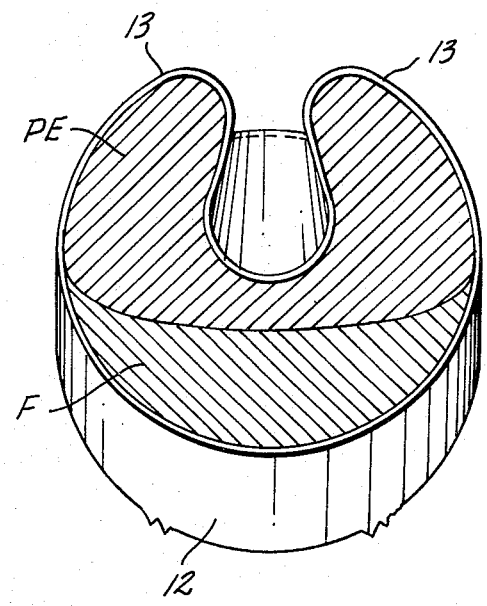
Figure 26:
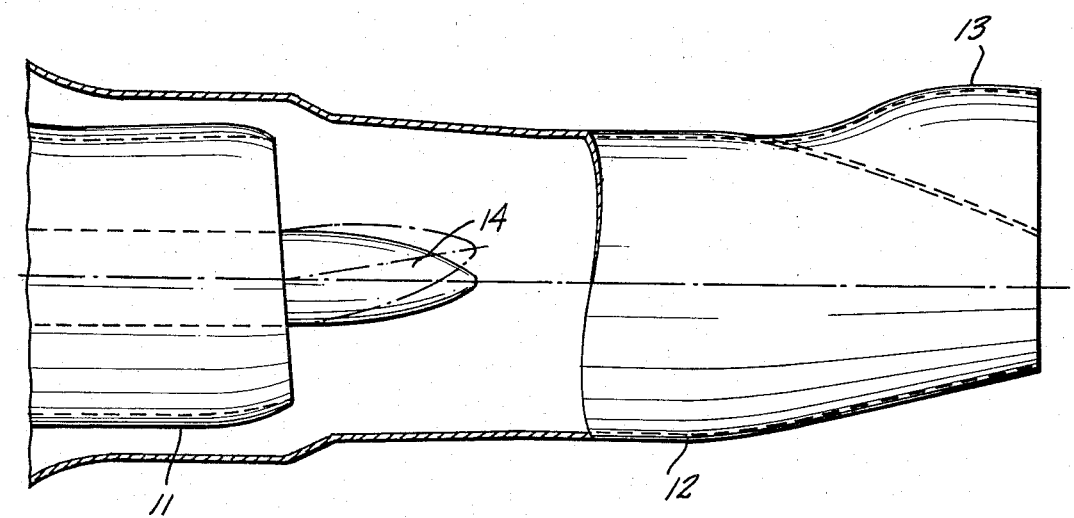

In the embodiment of the present invention shown in FIGS. 26, 27 and 28, the discharge end of the primary exhaust nozzle 11 of a turbofan is retracted a substantial distance forward of the discharge end of the fan or common nozzle 12. As is conventional, a central plug 14 is provided for structural support. The discharge end of primary exhaust nozzle 11 is canted slightly to direct the exhaust flow upward such that the fan flow is discharged below the exhaust flow. As shown in broken lines, the aft end portion of plug 14 can be swept upward to aid in deflecting the primary exhaust flow. Rather than being of circular cross section throughout its length, the top of the discharge end portion of the common nozzle is folded inward to form two lobes 13 disposed at opposite sides of the nozzle. As shown diagrammatically in FIG. 28, the fan flow F is discharged below the primary exhaust flow PE which reduces noise observed below the turbofan. In addition, a substantial portion of the primary exhaust flow is discharged through lobes 13 and mixes rapidly with ambient air, further reducing noise perceived below the turbofan.

The embodiment of FIG. 29 corresponds to the embodiment of FIGS. 26, 27 and 28, the only difference being that the discharge end portion of the primary exhaust nozzle 15 is swept upward rather than being canted. The central plug 14' is swept upward to be coaxial with primary exhaust nozzle 15 to aid in deflecting the primary exhaust flow upward. The flow pattern corresponds to the flow pattern shown in FIG. 28.

In the modification of FIGS. 30 and 31, the discharge end of the primary exhaust nozzle 16 is perpendicular to the longitudinal axis of the turbofan and is centered about such axis. To achieve the desired offsetting of the fan flow relative to the primary exhaust flow, the discharge end portion of the fan or common nozzle 17 is swept downward. Consequently, the high velocity primary exhaust flow still is discharged above the fan flow.

A further modification in the embodiment of FIGS. 30 and 31 is the deletion of the common nozzle lobes and the substitution of four small triangular deflector plates 18 which can be referred to as "vortex generators". Each deflector plate is supported from the discharge end of the common nozzle 17 by a cantilever support arm 19. Each plate is deployed at an angle to the axis of the common nozzle and positioned to deflect a portion of the upper part of the primary exhaust flow PE outward for mixing with ambient air.

Figure 32:
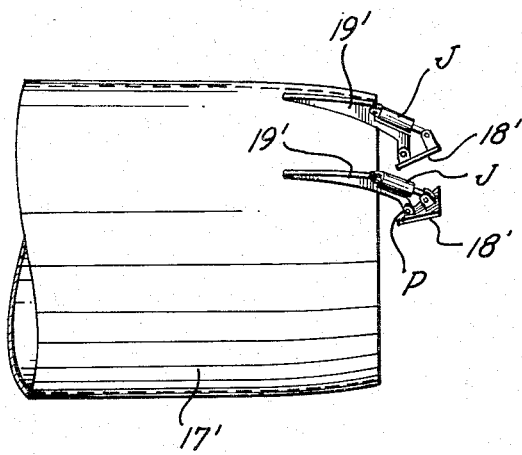
FIG. 32 is a side elevation of the discharge end portion of a turbofan improved with yet another embodiment of the present invention with parts broken away.
Figure 33:
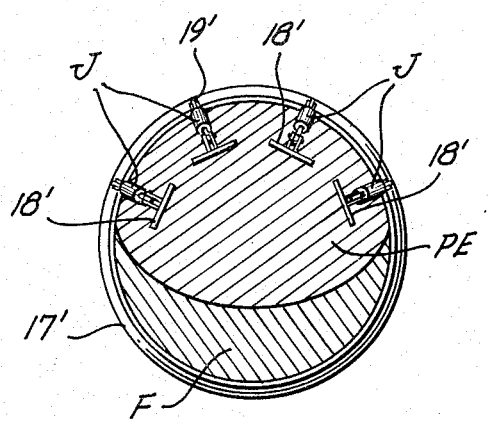
FIGS. 33 and 34 are somewhat diagrammatic end elevations of the turbofan of FIG. 32 with parts in different positions.

An advantage to using deflectors as opposed to lobes is that mechanism could be provided for retracting or changing the angle of the deflectors. For example, in the embodiment of FIGS. 32, 33 and 34, each of four separate upper deflector plates 18' is carried at the free end of a cantilever support arm 19' for swinging of the plate about the axis of a pivot P which is parallel to the plane of the discharge end of the common nozzle 17. Projection or retraction of the plunger arm of a hydraulic jack J connected between the support arm and the deflector plate changes the angle of the plate. In high altitude flight when noise suppression is not critical, the deflector plates are positioned with their broad faces parallel to the direction of movement of the primary exhaust flow PE as shown in FIG. 33. Alternatively, mechanism could be provided for retracting the deflectors, such as into the engine cowling. These changes will result in maximum efficiency of the thrust-producing jet engine in that there is little or no thrust loss because no portion of the primary exhaust flow is deflected for mixing with ambient air. When maximum noise suppression is desired, such as at takeoff, the jacks J can be extended to swing the deflectors 18' about the axes of their pivots P, or the deflectors can be projected from the engine cowling, such that each plate is deployed at an angle to the axis of the common nozzle 17', as shown in FIG. 32, for promoting mixing of the upper portion of the primary exhaust flow with ambient air.

Figure 34:
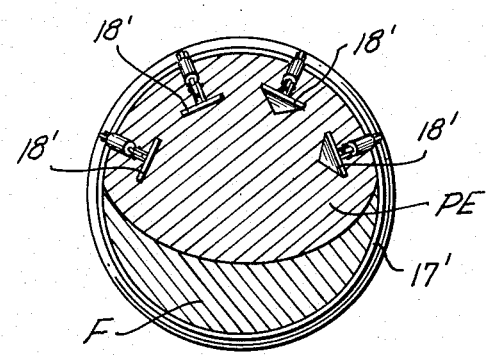

For a specific application, it may be desirable to reduce noise perceived at one side of a jet engine, instead of or in addition to reducing noise perceived below the engine. Sideline noise can be reduced by promoting mixing of the portion of the primary exhaust flow at the side of the nozzle opposite the side on which noise reduction is desired. For example, as shown in FIG. 34, the deflector plates 18' located at one side of the common nozzle 17' can be angled to promote mixing of the primary exhaust flow with ambient air for reducing noise perceived at the other side of the nozzle remote from the side on which mixing is promoted, while the deflector plates at such other side of the nozzle are disposed parallel to the direction of movement of the exhaust flow. The same effect would be achieved, for example, by rotating the common nozzle 12 of the embodiment of FIGS. 26 through 28 to displace lobes 13 toward the side of the common nozzle 12 remote from the side on which noise reduction is desired.

Figure 35:
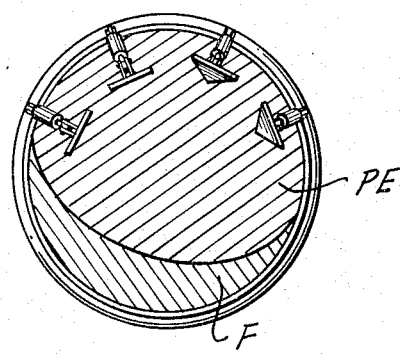
FIG. 35 is a somewhat diagrammatic end elevation of a slightly modified form of the embodiment of the present invention shown in FIGS. 32, 33 and 34.

To reduce sideline noise farther, the fan flow could be discharged in the pattern shown in FIG. 35 in which the thickest portion of the fan flow is positioned toward the side of the nozzle at which noise reduction is desired. This can be achieved, for example, by canting the primary exhaust generally away from the side on which noise reduction is desired, or by sweeping it away from such side. The same result of further reducing sideline noise can be achieved by rotating the primary exhaust nozzle 11 of the embodiment of FIGS. 26 through 28 conjointly with the common nozzle 12 of that embodiment to provide a fan flow which is asymmetrical with respect to a vertical plane.

Figure 36:
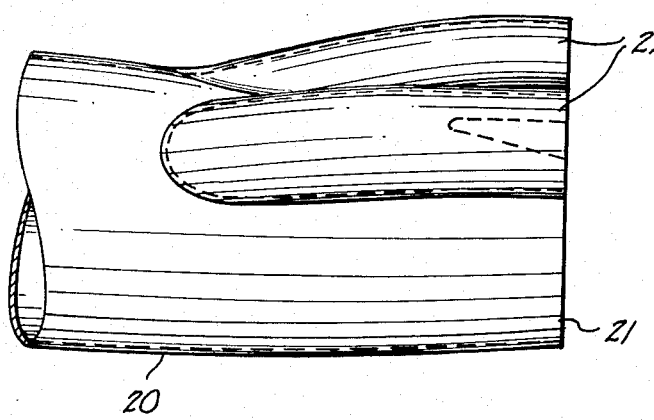
FIG. 36 is a side elevation of the discharge end portion of a turbojet improved in accordance with the present invention with parts broken away.
Figure 37:
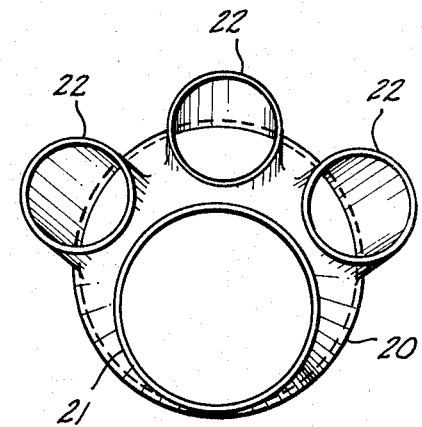
FIG. 37 is an end elevation of the turbojet of FIG. 36.

A turbojet application of the present invention using separate mixing tubes is shown in FIGS. 36 and 37. The discharge end portion of the turbojet exhaust nozzle 20 has a large lower tube 21 for discharging the major portion of the turbojet exhaust flow. Three somewhat smaller tubes 22, each diverging gradually outward from the exhaust nozzle 20, are positioned generally above tube 21. The almost undisturbed exhaust flow through tube 21 shields observers on the ground from increased high frequency noise generated by the rapid mixing of the upper portion of the exhaust flow by expulsion through the small upper tubes 21.

Figure 38:
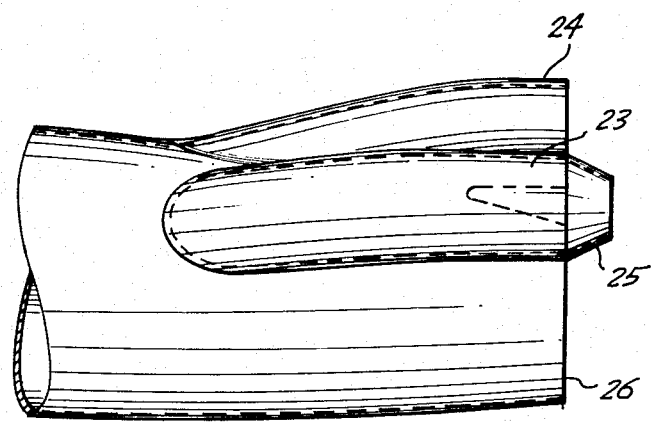
FIG. 38 is a side elevation of the discharge end portion of a turbojet improved in accordance with a further embodiment of the present invention with parts broken away.
Figure 39:
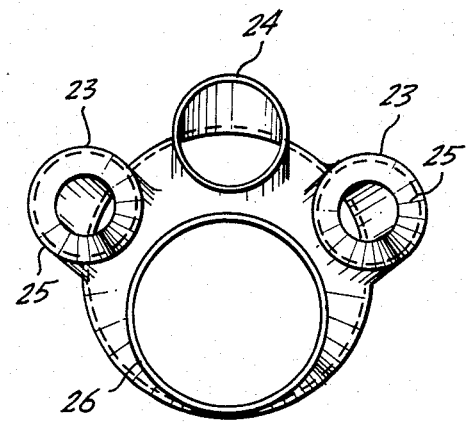
FIG. 39 is an end elevation of the turbojet of FIG. 38.

In the embodiment of FIGS. 36 and 37, all of the small upper tubes 21 are of the same size. In the turbojet embodiment of FIGS. 38 and 39, each of the small upper tubes 23 flanking the central upper tube 24 has a frustoconical end constriction 25 such that a smaller amount of exhaust flow is discharged from the side or flanking tubes than from the upper central tube 24. More noise is generated by the greater flow through tube 24 than by the flows through side tubes 23, but observers on the ground are shielded from such greater noise because tubes 24 is positioned directly over the thickest portion of the flow through the larger tube 26.

The turbojet embodiment of FIGS. 40 and 41 is similar to the previously described turbojet embodiments except that three upper deflector plates 27 are used to promote mixing of the upper portion of the exhaust flow with ambient air, rather than tubes as in the turbojet embodiments of FIGS. 36 to 39.

In the turbojet embodiment of FIGS. 42 and 43, the bottom half of the discharge end of an exhaust nozzle 30 is of circular cross section, whereas the top half of such exhaust nozzle is convoluted to form three parallel lobes 31 of equal size. Consequently, the lower portion of the turbojet exhaust flow is substantially undisturbed, whereas the upper portion of the exhaust flow mixes rapidly with ambient air as such upper portion is expelled from lobes 31.

In each of the turbojet embodiments, mechanism is provided for promoting rapid mixing of the upper portion of the exhaust flow with ambient air and the lower portion of such exhaust flow is substantially undisturbed. A desired degree of mixing of the upper portion of the exhaust flow with ambient air can be effected by selecting an appropriate number and size of tubes, lobes and/or deflectors. It is believed that the undisturbed lower portion shields observers located below the turbojet from high frequency noise generated by the mixing of the upper exhaust portion with ambient air.

The exhaust nozzle for each turbojet embodiment could be used as the common nozzle of a turbofan having a retracted primary exhaust nozzle, preferably with mechanism provided for discharging the turbofan fan flow below the primary exhaust flow. For example, the turbofan primary exhaust nozzle could be canted as shown in FIGS. 26, 27 and 28 or swept upward as shown in FIG. 29, or the common nozzle could be swept downward as shown in FIGS. 30 and 31, so that at least a substantial upper portion of the turbofan primary exhaust flow would be discharged through the mechanism for promoting rapid mixing with ambient air. Alternatively, any of the exhaust nozzles of the turbojet embodiments could be used as the primary exhaust nozzle of a turbofan having a fan nozzle encircling its primary exhaust nozzle. Preferably, mechanism would be provided for offsetting the primary exhaust flow upward relative to the fan flow.

Another alternative is shown in FIGS. 44 and 45 in which a fan nozzle 32 and a primary exhaust nozzle 33 are circular and concentric a substantial distance forward of their discharge ends. The top of the discharge end of the primary exhaust nozzle is convoluted in accordance with the turbojet embodiment of FIGS. 42 and 43 to provide three upper lobes 34, and the primary exhaust nozzle discharge end portion is swept upward so that all of the fan flow is discharged below the primary exhaust flow. The cross-sectional area of the fan nozzle 32 is the same as if a circular fan nozzle were used such as in the embodiment of the invention of application Ser. No. 943,973 shown in FIG. 14. Consequently, concentrating the fan flow below the primary exhaust flow results in thickening the fan flow to a greater extent than in the invention of application Ser. No. 943,973 in which only circular fan nozzles are used.

Figure 46:
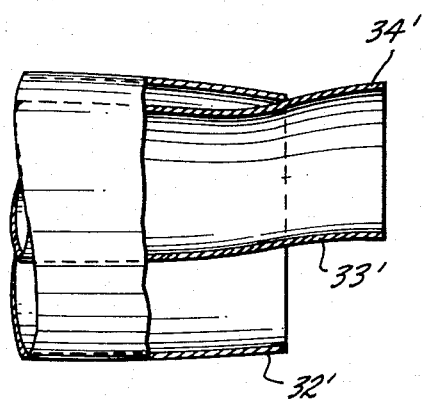
FIG. 46 is a side elevation of the discharge end portion of a turbofan modified in accordance with still another embodiment of the present invention with parts broken away.
Figure 47:
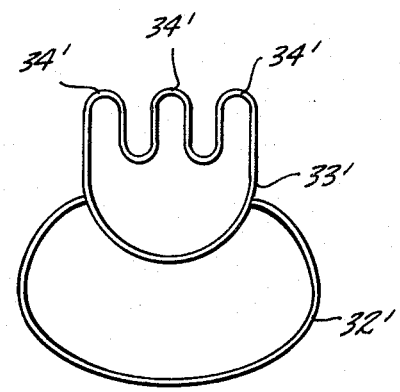
FIG. 47 is an end elevation of the turbofan of FIG. 46.
Figure 48:
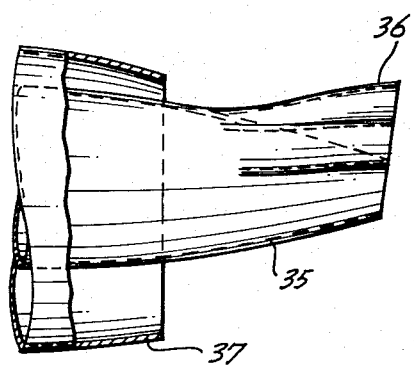
FIG. 48 is a side elevation of the discharge end portion of a turbofan modified in accordance with still another embodiment of the present invention with parts broken away.
Figure 49:
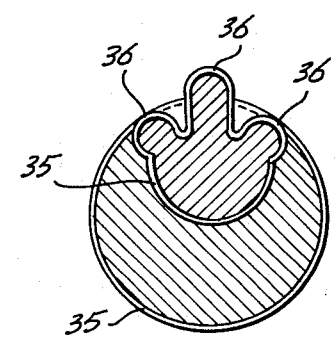
FIG. 49 is a somewhat diagrammatic end elevation of the turbofan of FIG. 48.

The embodiment of FIGS. 46 and 47 is identical to the embodiment of FIGS. 44 and 45 except that the discharge end of the primary exhaust nozzle 33' is located aft of the discharge end of the fan nozzle 32' a distance slightly less than one-half the diameter of the fan nozzle. Similarly, in the embodiment of FIGS. 48 and 49, a primary exhaust nozzle 35 has three upper discharge lobes 36 arranged symmetrically about the vertical plane containing the nozzle axis. Primary exhaust nozzle 35 is offset upward relative to a circular fan nozzle 37 and the discharge end of the primary exhaust nozzle is located aft of the discharge end of the fan nozzle a distance slightly less than the diameter of the fan nozzle.

Projection of the primary exhaust nozzle, as in the embodiment of FIGS. 46 and 47 or FIGS. 48 and 49, has little effect on the noise perceived below the turbofan. The upper portion of the primary exhaust flow still is mixed rapidly with ambient air, or with ambient air and the lesser velocity fan flow, by the action of the primary exhaust nozzle lobes 34' to 36; and the thickened fan flow discharged from fan nozzle 32' or 37 shields observers on the ground from the jet noise produced by the primary exhaust flow. However, mixing of the fan flow with ambient air starts to occur as soon as the fan flow is discharged from the fan nozzle. While the effects of the mixing layers of fan flow and ambient air can be measured a substantial distance downstream, at least one hundred times the thickness of the fan flow downstream, it is believed that for a distance greater than four o five times the thickness of the fan flow the velocity of such mixing layer is reduced to the point where it no longer provides a substantial noise-shielding effect. Consequently, it is preferred that the discharge end of the primary exhaust nozzle be located aft of the discharge end of the fan nozzle a distance no greater than three or four times the thickness of the fan flow.

Figure 50:
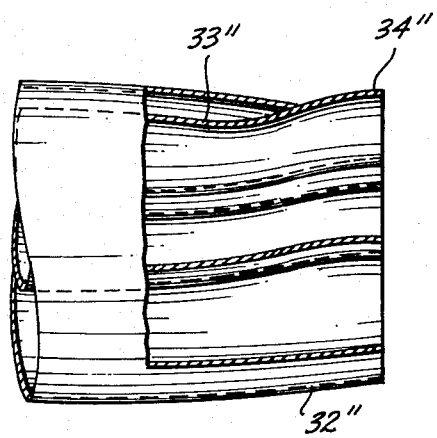
FIG. 50 is a side elevation of the discharge end portion of a turbofan modified in accordance with still another embodiment of the present invention with parts broken away.
Figure 51:
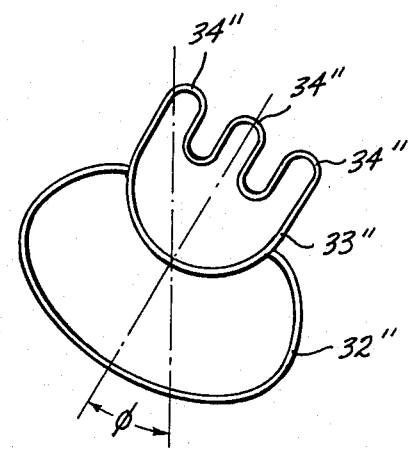
FIG. 51 is an end elevation of the turbofan of FIG. 50.

The embodiment of FIGS. 50 and 51 corresponds to the embodiment of FIGS. 44 and 45 with the discharge nozzle structure rotated clockwise as shown in the drawings through an angle of about 30 degrees. Some noise reduction occurs directly below the turbofan, but maximum noise reduction occurs at a sideline angle phi of 30 degrees, that is, maximum noise suppression is effected substantially directly opposite the side of the discharge nozzle structure at which mixing is promoted by the lobes 34" of primary exhaust nozzle 33". The fan nozzle 32" is symmetrical about a plane inclined 30 degrees to the vertical, further reducing noise in this sideline direction.

Figure 52:
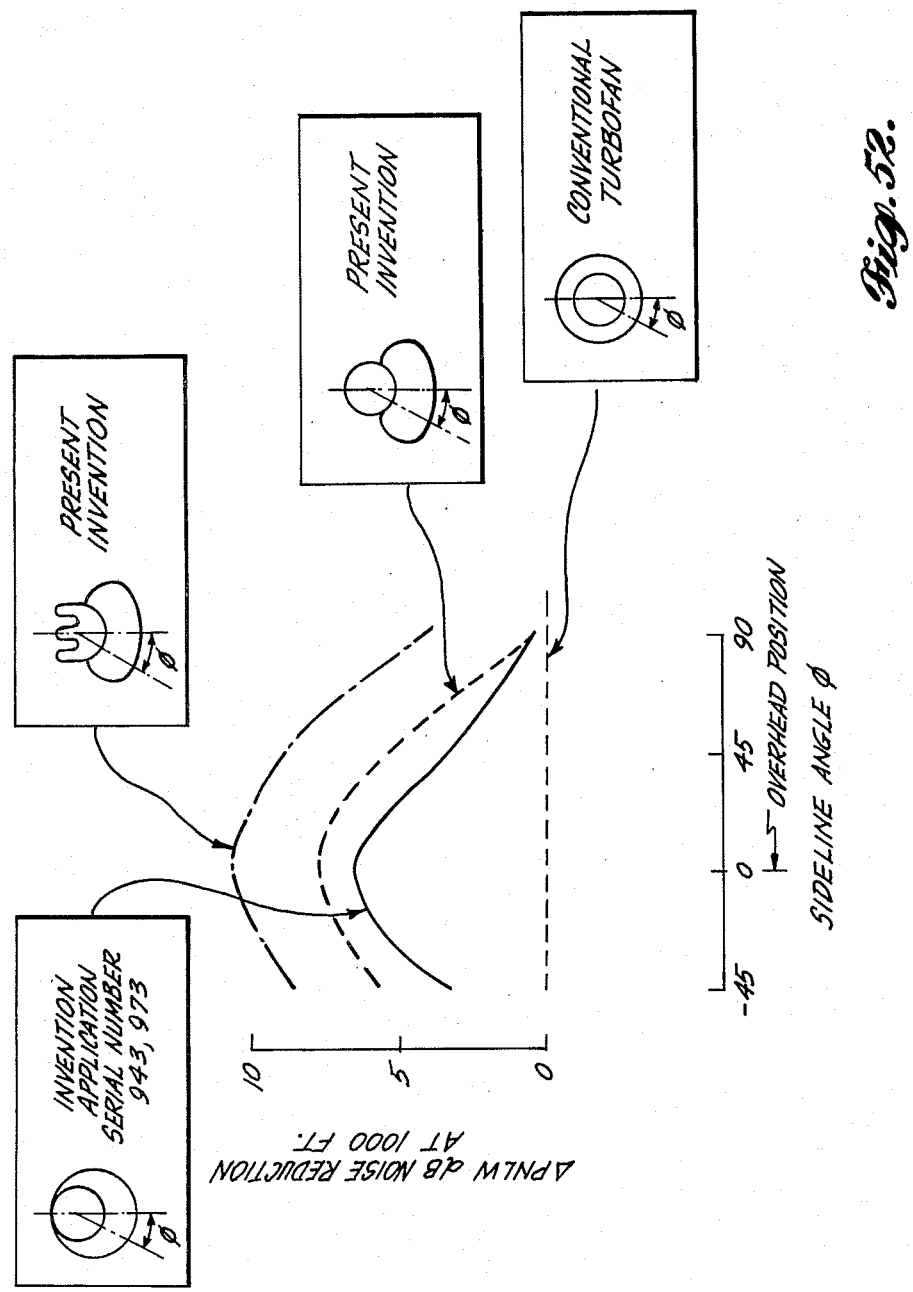
FIG. 52 is a graphic representation of the total noise reduction with reference to the sideline angle of the location at which the noise is measured achieved by one form of the invention of application Ser. No. 943,973 and two forms of the present invention as compared with one form of a conventional turbofan.

The asymmetrical nature of the noise reduction effected by use of the apparatus and method of the present invention and the invention of application Ser. No. 943,973 is shown in FIG. 52. Tests were conducted to compare the noise suppression of one form of a conventional turbofan with one form of the invention of application Ser. No. 943,973 and two forms of the present invention as a function of the sideline angle at which the noise generated by a turbofan was measured. The cross-sectional area of the discharge end of the primary exhaust nozzle and the cross-sectional area of the discharge end of the fan nozzle were the same for each exhaust model tested, the difference between the models being the shapes and relative locations of the primary exhaust nozzles and the fan nozzles.

As shown in short dash lines, the noise produced by a conventional turbofan having circular and concentric primary exhaust and fan nozzles is not dependent on the sideline angle phi at which the noise is measured. The other curves show noise reduction over conventional structures. As shown by the solid line, offsetting the circular cross section exhaust flow upward relative to the fan flow results in substantially less noise being observed generally below the turbofan. In addition, when the primary exhaust nozzle and fan nozzle both are symmetric about the vertical plane containing the turbofan axis, less noise is observed for the "overhead position" in which noise is measured directly below the turbofan than when noise is measured at a sideline location. As shown in long dash lines, noise is reduced even more by concentrating the fan flow below the primary exhaust flow to increase the thickness of the fan flow. As shown in dot-dash lines, maximum noise reduction is achieved below the aircraft by both concentrating the fan flow below the primary exhaust flow and promoting mixing of the upper portion of the primary exhaust flow with ambient air. Rotating the noise suppressing nozzle structures shown diagrammatically in FIGS. 52 through a small angle would result in shifting the curves to the right or left such that maximum noise suppression occurred other than at the direct overhead position. For example, testing of an exhaust model corresponding to the embodiment of the present invention shown in FIGS. 50 and 51 would result in observation of maximum noise suppression for a sideline angle of 30 degrees. The curve corresponding to such exhaust model would be the same as the dot-dash curve shifted to the right as shown in FIG. 52. Consequently, the present invention can be used to reduce noise observed directly below a turbofan or at any selected sideline angle.

Figure 53:
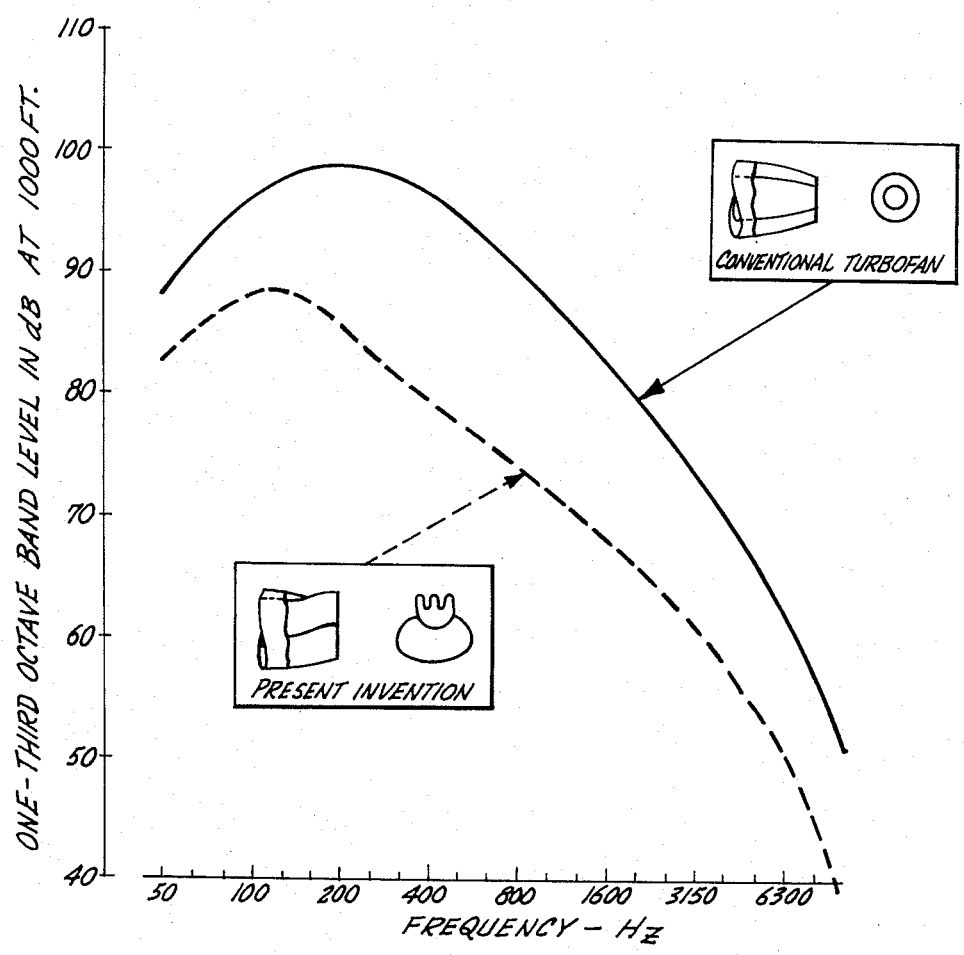
FIG. 53 is a graphic representation of the noise spectrum with reference to frequency produced by one embodiment of the present invention as compared with the noise spectrum produced by a comparable form of a conventional turbofan.

Tests also were conducted to determine the effect of promoting mixing of the upper portion of the exhaust flow of a turbofan having discharge nozzles in accordance with the embodiment of FIGS. 44 and 45 as compared to conventional circular and concentric nozzles having coplanar discharge ends. The strengths of noise components of various frequencies were measured and calculated for a point in the vertical plane containing the engine axis, below and behind the engine, 1,000 feet from the engine fan inlet at a "θ" angle of 140°. To simulate take-off, measurements were taken for an exhaust flow velocity of 1800 feet per second.

as shown in FIG. 53, noise components of all frequencies below the engine are reduced substantially by use of the present invention. In addition, contrary to the expected result, promoting mixing of the upper portion of the exhaust flow does not shift the noise spectrum substantially to include a greater proportion of high frequency noise components. To the contrary, there is only a slight spectrum shift, as seen by comparing the shapes of the respective spectrum curves shown in FIG. 53.

Total noise reduction achieved by use of the embodiment of FIGS. 44 and 45 is shown as a dot-dash line in FIG. 25. As shown in that figure, there is a substantial total noise reduction as compared to the noise produced by conventional circular and concentric nozzles or by nozzles modified in accordance with the invention of application Ser. No. 943,973. For the representative primary exhaust flow velocity of 1,900 feet per second (580 m/sec) at takeoff for a typical turbofan engine, for example, a Pratt & Whitney JT8D engine, the noise measured below the engine modified in accordance with the embodiment of FIGS. 44 and 45 (using model exhaust nozzles) was about 10 dB less than the noise measured below the engine having conventional nozzles, and about 3 or 4 dB less than the noise measured below the engine modified in accordance with the invention of application Ser. NO. 943,,973.

For a specific application of the present invention, the optimum nozzle structure and arrangement must be determined experimentally. First, measurements are taken for a desired form of mixing mechanism, and then, for a turbofan, measurements are taken to determine the nozzle structure and arrangement which results in the desired offset, shape and thickness of the turbofan fan flow. For example, using the embodiment of FIGS. 26, 27 and 28, it is preferred that approximately the upper one-half of the primary exhaust flow pass through the two upper lobes and that the fan flow be crescent-shaped and located below the exhaust flow as shown in FIG. 28. Model exhaust nozzle tests for a typical turbofan engine, for example, a Pratt & Whiteney JT8D engine, have shown that retracting the exhaust nozzle forward of the common discharge nozzle a distance equal to about two or three times the diameter of the exhaust nozzle and canting its discharge end at an angle of about four to six degrees to the vertical produces an acceptable nozzle pattern. The optimum noise structure and arrangement will vary from engine to engine. In addition, the location and shape of the airplane structure adjacent to the engine exhaust, such as the body, tail or fins, must be taken into consideration in determining the optimum nozzle structure and arrangement.

I claim:

1. In a jet engine including a nozzle for a discharge gas flow of such engine, such nozzle having a discharge end with a smooth continuous periphery without any substantial fore-and-aft extending notch and including noise-suppressing mixing means for promoting rapid mixture of at least a portion of the discharge gas flow with ambient air rearward of the nozzle discharge end, the improvement comprising the noise-suppressing mixing means including means for promoting rapid mixing of the upper portion of the discharge gas flow with ambient air to a greater extent than mixing of the lower portion of the discharge gas flow with ambient air.

2. In a jet engine including a nozzle for a discharge gas flow of such engine, such nozzle including noise-suppressing mixing means for promoting rapid mixing of at least a portion of the discharge gas flow with ambient air, the improvement comprising the noise-suppressing mixing means including means for promoting substantially more rapid mixing of the upper portion of the discharge gas flow with ambient air than of the lower portion of the discharge gas flow with ambient air, the lower portion of the discharge end of the nozzle being arcuate for discharging the lower portion of the discharge gas flow without promoting rapid mixing of such lower portion with ambient air.

3. In a jet engine including a nozzle for a discharge gas flow of such engine, such nozzle including noise-suppressing mixing means for promoting rapid mixing of at least a portion of the discharge gas flow with ambient air, the improvement comprising the noise-suppressing mixing means including means for promoting substantially more rapid mixing of the upper portion of the discharge gas flow with ambient air than of the lower portion of the discharge gas flow with ambient air, such noise-suppressing mixing means including at least one lobe located in the upper portion of the discharge end portion of the nozzle.

4. In the jet engine defined in claim 3, the noise-suppressing mixing means including two lobes disposed at opposite sides of the nozzle.

5. In the jet engine defined in claim 3, the noise-suppressing mixing means including several lobes spaced generally circumferentially of the nozzle.

6. In a jet engine including a nozzle for a discharge gas flow of such engine, such nozzle including noise-suppressing mixing means for promoting rapid mixing of at least a portion of the discharge gas flow with ambient air, the improvement comprising the noise-suppressing mixing means including means for promoting substantially more rapid mixing of the upper portion of the discharge gas flow with ambient air than of the lower portion of the discharge gas flow with ambient air, such noise-suppressing mixing means including a lower tube of large cross-sectional area for discharging the lower portion of the discharge gas flow and at least one upper tube disposed above said lower tube and of substantially smaller cross-sectional area than said lower tube.

7. In the jet engine defined in claim 6, the noise-suppression mixing means including several upper tubes each substantially smaller than and disposed generally above the large lower tube.

8. In the jet engine defined in claim 7, the upper tubes being spaced substantially uniformly circumferentially of the large lower tube.

9. In the jet engine defined in claim 7, all of the upper tubes being of the same size.

10. In the jet engine defined in claim 7, at least one of the upper tubes having constriction means for effecting expulsion of a smaller portion of the discharge gas flow through such upper tube than through another of the upper tubes.

11. In a jet engine including a nozzle for a discharge gas flow of such engine, such nozzle including noise-suppressing mixing means for promoting rapid mixing of at least a portion of the discharge gas flow with ambient air, the improvement comprising the noise-suppressing mixing means including means for promoting substantially more rapid mixing of the upper portion of the discharge gas flow with ambient air than of the lower portion of the discharge gas flow with ambient air, such noise-suppressing mixing means including deflectors disposed for promoting rapid mixing of the upper portion of the discharge gas flow with ambient air.

12. In the jet engine defined in claim 11, the discharge end of the nozzle being generally circular.

13. In the jet engine defined in claim 11, the deflectors being disposed in the path of the discharge gas flow.

14. In the jet engine defined in claim 13, the deflectors being angled for deflecting the upper portion of the discharge gas flow upward.

15. In a jet engine including a nozzle for a discharge gas flow of such engine, such nozzle including noise-suppressing mixing means for promoting rapid mixing of at least a portion of the discharge gas flow with ambient air, the improvement comprising the noise-suppressing mixing means including means for promoting substantially more rapid mixing of the upper portion of the discharge gas flow with ambient air than of the lower portion of the discharge gas flow with ambient air, such jet engine being a turbofan including means for producing a primary exhaust flow and means for producing a fan flow, the noise-suppressing mixing means including means for promoting rapid mixing of the upper portion of the primary exhaust flow with ambient air.

16. In the jet engine defined in claim 15, means for offsetting the primary exhaust flow upward relative to the fan flow.

17. In the jet engine defined in claim 16, such engine including a fan nozzle and a primary exhaust nozzle, the discharge end of the primary exhaust nozzle being disposed a substantial distance forward of the discharge end of the fan nozzle and the upper portion of the fan nozzle including means for promoting rapid mixing of the flow discharged through such upper portion of the fan nozzle with ambient air.

18. In the jet engine defined in claim 17, the discharge end of the primary exhaust nozzle having a canted discharged end.

19. In the jet engine defined in claim 17, the primary exhaust nozzle having a discharge end portion swept upward relative to the longitudinal axis of the fan nozzle.

20. In the jet engine defined in claim 17, the fan nozzle having a discharge end portion swept downward relative to the longitudinal axis of the primary exhaust nozzle.

21. In the jet engine defined in claim 17, the upper part of the discharge end portion of the fan nozzle having lobes.

22. In the jet engine defined in claim 17, deflectors carried by the upper part of the discharge end portion of the fan nozzle.

23. In the jet engine defined in claim 17, the fan nozzle being disposed below the discharge end portion of the primary exhaust nozzle for concentrating the fan flow below the primary exhaust flow.

24. In the jet engine defined in claim 17, the discharge ends of the primary exhaust nozzle and the fan nozzle being coplanar.

25. In the jet engine defined in claim 16, such engine including a fan nozzle and a primary exhaust nozzle, the discharge end of the primary exhaust nozzle being disposed a substantial distance aft of the discharge end of the fan nozzle, and the upper portion of the primary exhaust nozzle including means for promoting rapid mixing of the upper portion of the primary exhaust flow with ambient air.

26. In a turbofan including a primary exhaust nozzle, means for producing a primary exhaust flow through such primary exhaust nozzle, a fan nozzle and means for producing a fan flow through such fan nozzle, the improvement comprising the turbofan including means for reducing noise perceived at a selected location, said noise-reducing means including means for thickening the fan flow at the side of the turbofan closest to the selected location and means for promoting mixing with ambient air of the portion of the primary exhaust flow at the side of the turbofan generally remote from the selected location.

27. In a jet engine including an exhaust nozzle having a substantially planar discharge end without any substantial fore-and-aft extending notch, means for producing an exhaust flow through such nozzle and noise-reducing mixing means for promoting rapid mixing of at least a portion of the exhaust flow with air surrounding the exhaust nozzle immediately downstream of such nozzle, the improvement comprising the mixing means including means for promoting rapid mixing of only the generally upper portion of the exhaust flow with air generally above the exhaust nozzle for reducing noise perceived below the jet engine without shifting the spectrum of such noise to include a substantially greater proportion of high frequency noise.

28. The method of reducing the noise perceived at a desired location speed from a jet engine including a discharge nozzle having a generally planar discharge end without any substantial turbulence-promoting fore-and-aft extending notch which comprises promoting substantially more rapid mixing of the portion of the discharge gas flow of such engine at its side generally remote from such desired location than at its side closer to such desired location.

29. In a jet engine including a nozzle for a discharge gas flow of such engine, such nozzle having a discharge end with a smooth continuous periphery without any substantial fore-and-aft extending notch and including noise-suppressing mixing means for promoting rapid mixing of at least a portion of the discharge gas flow with ambient air rearward of the nozzle discharge end, the improvement comprising the noise-suppressing mixing means including means for promoting rapid mixing of the upper one-half of the discharge gas flow with ambient air to a greater extent than mixing of the lower one-half of the discharge gas flow with ambient air.

* * * * *

UNITED STATES PATENT AND TRADEMARK OFFICE
CERTIFICATE OF CORRECTION

PATENT NO. : 4,280,587
DATED : July 28, 1981
INVENTOR(S) : Waman V. Bhat

It is certified that error appears in the above-identified patent and that said Letters Patent are hereby corrected as shown below:

Title page, under "Other Publications", insert ---Vol. 1,--- before "p. 207".

Column 8, lines 35 and 36, the portion of the equation between the square brackets should read as follows:

$$10^x, \text{ where } x = \frac{(PNL(\theta) - 10 \log \sin^2\theta)}{10}$$

Column 14, line 28, cancel "mixture" and insert ---mixing---.

Column 16, line 64, cancel "speed" and insert ---spaced---.

Signed and Sealed this

Twenty-fourth Day of November 1981

[SEAL]

Attest:

GERALD J. MOSSINGHOFF

Attesting Officer

Commissioner of Patents and Trademarks